Dec. 19, 1939.  C. A. McDUFFEE ET AL  2,184,225
MIXING DEVICE
Filed June 2, 1938  2 Sheets-Sheet 1

Inventors:
Claude A. McDuffee,
and Taylor W. Creech.
By Chritton, Wiles, Davis, Hirsch and Dawson.
Attys.

Dec. 19, 1939.  C. A. McDUFFEE ET AL  2,184,225
MIXING DEVICE
Filed June 2, 1938  2 Sheets-Sheet 2

Patented Dec. 19, 1939

2,184,225

UNITED STATES PATENT OFFICE 2,184,225

MIXING DEVICE

Claude A. McDuffee, Chicago, Ill., and Taylor W. Creech, Joplin, Mo.

Application June 2, 1938, Serial No. 211,454

2 Claims. (Cl. 259—107)

This invention relates to mixing apparatus, and more particularly to an improved agitator and mixing bowl which may be used with standard mixing machines.

The primary object of the invention is to provide improved apparatus for thoroughly mixing or kneading the contents of a mixing bowl in a uniform manner.

Many excellent mixing devices are in commercial use but considerable difficulty is encountered in obtaining uniform results under identical mechanical conditions, working on identical material. This is particularly noticeable where the material to be mixed has a heavy consistency, such as bread dough, because the dough has a tendency to wad and crawl up on the agitator so that the kneading action of the machine is greatly reduced. In scientific laboratory work it is important, in developing recipes and the like, that the mechanical operation be uniform and standard so that accurate comparisons can be made of various flours, shortening, and the like.

A further object of the invention is to provide a strong, simple, and inexpensive agitator and mixing bowl that will permit the material to be removed easily after a mixing operation and also permit the apparatus to be cleaned easily.

In order to accomplish the purpose of the invention it has been found desirable to provide a fixed stud or finger in the bowl which cooperates with the moving arms of the agitator, the latter arms being disposed in a definite relation to the stud and side wall of the bowl. That is, for the best results there should be sufficient clearance that a kneading action is performed, as distinguished from a shearing action, on the material.

Figure 1:
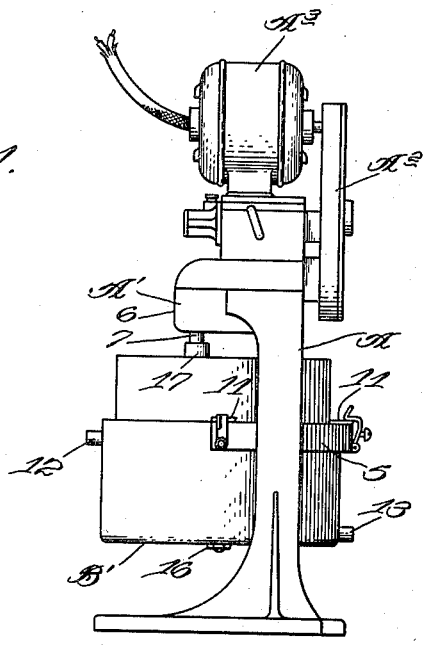
Figure 2:
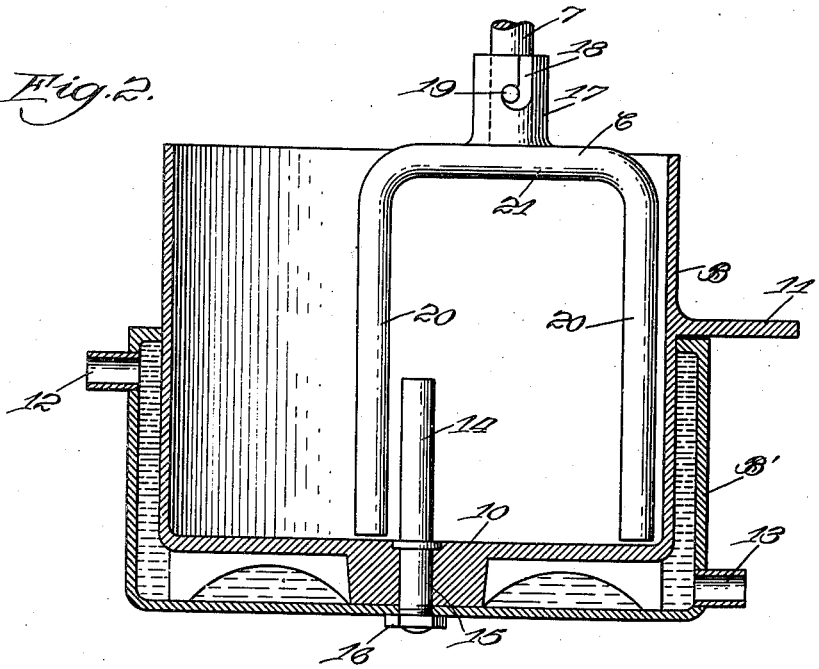
Figure 3:
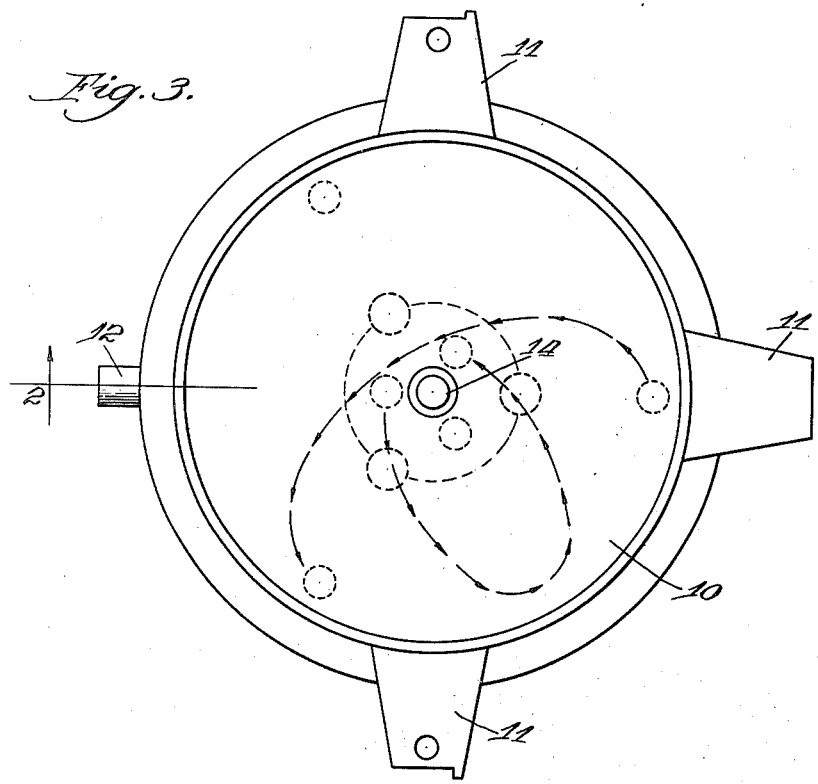
Figure 4:
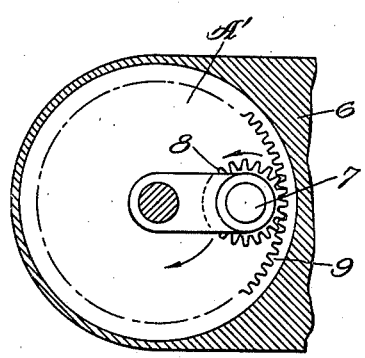

The invention is illustrated in a preferred embodiment in the accompanying drawings, in which:

Figure 1 is a side elevational view of a mixing machine provided with the improved agitator and mixing bowl; Fig. 2 is a broken vertical sectional view of the mixing bowl showing the agitator in operative position, taken as indicated at line 2 of Fig. 3; Fig. 3 is a plan view of the mixing bowl showing in dotted lines some of the various positions assumed by the agitator in a cycle of operations; and Fig. 4 is a fragmentary view of the planetary drive.

In the embodiment illustrated, A designates the main frame of the machine provided with a planetary driving gear A' which is driven by a suitable transmission A² from an electric motor A³; B, a mixing bowl provided with a water jacket B'; and C, a U-shaped agitator.

The main frame A, planetary gearing A', speed control transmission A², and driving motor A³, are all of well-known construction. The machine illustrated is known on the market as a "C-10 Hobart" mixer. The machine has a special supporting bracket 5 in which the mixing bowl may be detachably mounted and is arranged so that the bowl may be raised and lowered from operative position to facilitate handling.

The planetary drive mechanism A' is enclosed by a housing 6 from which a shaft 7 depends and to which the agitator may be detachably connected. Within the housing A' is a pinion gear 8 which is rotated bodily around the center of the mixing bowl and the gear is held in mesh with a planetary gear 9 which causes the agitator arms to make about three revolutions each time the pinion gear rotates around within the planetary gear.

The mixing bowl is an open top, round, cylindrical container having a bottom wall 10. The bowl is provided with suitable arms 11 which are gripped by the bracket 5 on the mixing machine. Preferably the lower portion of the bowl is provided with a water jacket B' having an inlet conduit 12 and an outlet conduit 13 to which hoses may be attached to circulate cooling water or heating water to maintain a desired temperature within the bowl. An axially disposed stud 14 is fixed to the bottom wall of the bowl and is designed to cooperate with the agitator in its mixing operation. The lower end of the stud is shown with a projection 15 which passes through the bottom of the water cooler and grips the latter in position by means of a nut 16. Preferably, the stud 14 extends up to about the center of the bowl.

The agitator C is attached to the shaft 7 by means of a hollow shank 17 provided with bayonet slots 18 which cooperate with pins 19 on said shaft. The agitator has a pair of parallel downwardly extending arms 20 which are integrally formed with a cross-bar 21 secured to the shank 17. The arms 20 and stud 14 are of the same diameter and have a circular cross-section. In the embodiment illustrated, the bowl has an inside diameter of about seven and one-fourth inches and the stud 14 has a diameter of seven-sixteenths of an inch and is preferably made of a mild steel. For larger bowls the agitator and stud may be modified in size.

It may be noted that the arms 20 are separated by a greater distance than the radius of the bowl so that the arms 20 rotate eccentrically about the stud 14. A clearance between the stud 14 and the arms 20 and also between the arms 20 and the side walls of the bowl is sufficient to produce a kneading action on the material rather than a shearing action. This clearance is a little less than half the diameter of the stud.

To operate the device the materials to be mixed are placed in the bowl and the bowl mounted in the bracket 5 which is adapted to raise it into the operative position shown in Figs. 1 and 2. The motor is then started and permitted to run a definite length of time and drive the agitator at the proper speed through regulation of the transmission A². Excellent results are thus obtained and it has been found that the dough will not climb up the arms 20 and cling to the cross-bar 21 or shank 17 and thereby escape the mixing operation.

By using the same type of equipment under the same operating conditions, which are fully controllable, standard results are obtained in laboratories in various parts of the country and products may be accurately and scientifically compared.

The foregoing detailed description has been given for clearness of understanding only, and no unnecessary limitations should be understood therefrom, but the appended claims should be construed as broadly as permissible, in view of the prior art.

We claim:

1. In a dough mixing device of the character set forth: a vertically disposed cylindrical mixing bowl having one centrally disposed round stud extending up near to the center of the bowl; a single U-shaped agitator journalled above said bowl and having parallel round arms disposed so as to rotate eccentrically about said stud; and driving means for moving said agitator bodily around the stud while rotating the arms with respect to said stud.

2. A device as specified in claim 1, in which the stud and arms of the agitator have substantially equal diameters, and the arms of the agitator are spaced apart so that during rotation they will clear said stud and the cylindrical side walls of the bowl by a distance equal to about half the diameter of the stud.

CLAUDE A. McDUFFEE.
TAYLOR W. CREECH.